(12) United States Patent
Smeenk (10) Patent No.: US 9,016,648 B2
(45) Date of Patent: Apr. 28, 2015

(54) MOUNTING SYSTEM FOR AN ELECTRONIC TEACHING BOARD

(75) Inventor: Antonius Theodorus Smeenk, Silvolde (NL)

(73) Assignee: Teachyou B.V., Silvolde (NL)

( * ) Notice: Subject to any disclaimer, the term of this patent is extended or adjusted under 35 U.S.C. 154(b) by 700 days.

(21) Appl. No.: 13/141,271

(22) PCT Filed: Dec. 17, 2009

(86) PCT No.: PCT/NL2009/050774
§ 371 (c)(1),
(2), (4) Date: Aug. 18, 2011

(87) PCT Pub. No.: WO2010/074564
PCT Pub. Date: Jul. 1, 2010

(65) Prior Publication Data
US 2012/0112025 A1    May 10, 2012

(30) Foreign Application Priority Data

Dec. 23, 2008  (NL) .................................. 2002369
Feb. 5, 2009   (NL) .................................. 2002498

(51) Int. Cl.
| | |
|---|---|
| E04G 3/00 | (2006.01) |
| G03B 21/56 | (2006.01) |
| F16M 11/04 | (2006.01) |
| F16M 11/08 | (2006.01) |
| F16M 11/10 | (2006.01) |
| F16M 11/18 | (2006.01) |
| F16M 11/20 | (2006.01) |
| F16M 11/24 | (2006.01) |
| F16M 11/38 | (2006.01) |
| F16M 13/02 | (2006.01) |

(52) U.S. Cl.
CPC .............. *G03B 21/562* (2013.01); *F16M 11/04* (2013.01); *F16M 11/08* (2013.01); *F16M 11/10* (2013.01); *F16M 11/18* (2013.01); *F16M 11/2014* (2013.01); *F16M 11/2092* (2013.01); *F16M 11/24* (2013.01); *F16M 11/38* (2013.01); *F16M 13/02* (2013.01); *F16M 2200/044* (2013.01); *F16M 2200/063* (2013.01); *F16M 2200/065* (2013.01)

(58) Field of Classification Search
CPC .............. A63B 63/083; A63B 2208/12; A61G 12/005; A61G 13/107; A61G 2205/10; A61G 2203/723; F16M 11/04; F16M 13/00; F16M 13/02; F16M 11/10; F16M 11/2014; F16M 11/2092
USPC ......... 248/278.1, 285.1, 495, 225.11, 225.21, 248/276.1, 279.1, 274.1, 284.1, 291.1, 248/292.11, 294.1, 280.11, 281.11, 123.11, 248/124.1, 917, 918, 919, 920, 921, 922, 248/923, 201, 297.11, 324, 205.1; 473/484, 473/483; 361/679.02
See application file for complete search history.

(56) References Cited

U.S. PATENT DOCUMENTS 1,088,669 A * 2/1914 Allen ........................ 248/123.11
1,092,637 A * 4/1914 Dusak ........................... 379/449

(Continued)

*Primary Examiner* — Kimberly Wood
(74) *Attorney, Agent, or Firm* — Jensen & Puntigam, PS (57) ABSTRACT

The invention relates to a mounting system (1) for mounting an electronic teaching board (2) on a surface, comprising four legs (4A, 4B, 4C, 4D) which are mutually connected such that the position of the electronic teaching board can be adjusted in both horizontal and vertical direction and arresting means for locking the electronic teaching board in the adjusted position.

6 Claims, 12 Drawing Sheets

(56) References Cited

U.S. PATENT DOCUMENTS

| | | | | |
|---|---|---|---|---|
| 1,178,058 A | * | 4/1916 | Cruse | 248/278.1 |
| 1,340,108 A | * | 5/1920 | Blasco | 248/124.1 |
| 1,345,910 A | * | 7/1920 | Cozart | 248/277.1 |
| 2,313,188 A | * | 3/1943 | Woodburn | 473/484 |
| 3,765,676 A | * | 10/1973 | Bearson et al. | 473/484 |
| 4,183,489 A | * | 1/1980 | Copher et al. | 248/278.1 |
| 4,208,028 A | * | 6/1980 | Brown et al. | 224/185 |
| 4,395,040 A | * | 7/1983 | White | 473/484 |
| 4,447,031 A | * | 5/1984 | Souder et al. | 248/281.11 |
| 4,836,478 A | * | 6/1989 | Sweere | 248/279.1 |
| 4,844,387 A | * | 7/1989 | Sorgi et al. | 108/5 |
| 5,108,063 A | * | 4/1992 | Koerber et al. | 248/284.1 |
| 5,388,821 A | * | 2/1995 | Blackburn | 473/484 |
| 5,603,496 A | * | 2/1997 | Rappaport | 473/487 |
| 5,667,186 A | * | 9/1997 | Luber et al. | 248/550 |
| 5,738,316 A | * | 4/1998 | Sweere et al. | 248/123.11 |
| 5,743,503 A | * | 4/1998 | Voeller et al. | 248/284.1 |
| 5,772,174 A | * | 6/1998 | Hirsch et al. | 248/447.1 |
| 5,799,917 A | * | 9/1998 | Li | 248/284.1 |
| 5,918,841 A | * | 7/1999 | Sweere et al. | 248/123.11 |
| 6,012,693 A | * | 1/2000 | Voeller et al. | 248/280.11 |
| 7,448,584 B2 | * | 11/2008 | Chen et al. | 248/278.1 |
| 7,600,728 B2 | * | 10/2009 | Petrick et al. | 248/286.1 |
| 7,823,843 B2 | * | 11/2010 | Oberlaender et al. | 248/118 |
| 7,984,888 B2 | * | 7/2011 | Park | 248/281.11 |
| 8,006,440 B2 | * | 8/2011 | Thomas et al. | 52/29 |
| 8,070,120 B2 | * | 12/2011 | Lange et al. | 248/284.1 |
| 8,074,950 B2 | * | 12/2011 | Clary | 248/280.11 |
| 8,342,467 B2 | * | 1/2013 | Stachowski et al. | 248/280.11 |
| 2004/0245419 A1 | * | 12/2004 | Sweere et al. | 248/276.1 |
| 2007/0001076 A1 | * | 1/2007 | Asamarai et al. | 248/281.11 |
| 2008/0258029 A1 | * | 10/2008 | Zhang | 248/284.1 |
| 2009/0065667 A1 | * | 3/2009 | Bakkom et al. | 248/205.1 |
| 2009/0179128 A1 | * | 7/2009 | Boberg | 248/278.1 |

\* cited by examiner

MOUNTING SYSTEM FOR AN ELECTRONIC TEACHING BOARD

TECHNICAL FIELD

The invention relates to a mounting system for mounting an electronic teaching board on a surface.

BACKGROUND OF THE INVENTION

Electronic teaching boards, also referred to as digital blackboards or digiboards for short, are increasingly being applied in education and in other places where people work together, such as offices. An electronic teaching board is an interactive teaching board connected to a computer with associated control software. Diverse operations can be carried out on the electronic teaching board. As with a standard blackboard, usually a chalkboard, instructions can be written thereon manually and can now be digitally stored using the computer. In addition, computer images can be shown thereon.

An example of a commonly used type of electronic teaching board is an electronic whiteboard. The electronic whiteboard co-acts with a video projector (also referred to as a beamer) with which the images, including presentations, internet pages, films and so on can be shown on the electronic whiteboard.

In the present situation these electronic whiteboards are generally mounted fixedly on the wall at the front of the classroom. The projector is fixed to the ceiling or on a wall bracket. In a number of cases the electronic whiteboards are height-adjustable, the projector then co-displacing on an arm. The existing chalkboard is usually removed; a traditional whiteboard is often also mounted to enable writing of annotations to be kept for longer.

EP 1785064 describes an example of a mounting system for mounting an electronic teaching board on a surface, wherein the position of the electronic teaching board is height-adjustable.

Owing to the arrangement of the electronic teaching board at the front all students are greatly involved in the presentation on the board. In a number of cases this is desirable, in other cases it is better if the attention of the whole class is not directed at the digiboard, for instance if the instruction or presentation is intended for only one group in a combined class or if instruction is being given to a relatively small group of students who are having problems with the subject matter or who, on the contrary, are engaged in more in-depth or advanced study. Students to whom the presented material is of no interest may be distracted by it.

In recent years education has become increasingly adaptive: this means that differences between students are taken into account. Inherent to this are working in groups, processing subject matter independently, researching, optionally together with others. In addition, a teacher increasingly gives instruction to groups of students, or he/she acts increasingly as a coach/mentor.

DISCLOSURE OF THE INVENTION

With the arrival of electronic teaching boards, education is at risk of once again becoming more frontal, and thereby possibly even more classical. The achievements of adaptive education are in danger of being partially lost.

There is therefore a need for a mounting system which makes it possible for the electronic teaching board to be used by or for smaller groups of students without the rest of the class thereby being too greatly distracted.

In order to meet this need the invention provides a mounting system for mounting an electronic teaching board on a surface, comprising four legs which are connected for mutual pivoting, first fixing means for fixing the electronic teaching board to one or more of the legs, second fixing means for fixing at least one of the legs to the surface, wherein the mounting system is adapted such that the position of the electronic teaching board relative to the surface can be adjusted in both horizontal and vertical direction, which mounting system further comprises arresting means for arresting the electronic teaching board in the adjusted position, wherein the first fixing means are adapted for rotatable fixing of the electronic teaching board to one of the legs and/or wherein one of the legs is adapted for rotatable fixing to the surface.

Using the mounting system according to the invention the position of the electronic teaching board can be adjusted such that it can be viewed from any desired position in a classroom. The viewing angle can be optimally adjusted through rotation of the electronic teaching board, as a result of which the flexibility of the mounting system according to the invention is increased still further. The rotatable fixing to the surface, such as a wall or a pillar, in a classroom increases still further the flexibility and the number of adjustment options, and thereby the viewing angle. When it is not in use the electronic teaching board can moreover be set to a 'folded-away' position, for instance flat against the wall. This creates the possibility of not only using the electronic teaching board with mounting system according to the invention as an alternative to an existing chalkboard, but also of optionally mounting it adjacently thereof as an addition thereto.

According to a first preferred embodiment, the four legs are connected in mutually pivotable manner to form a parallelogram. A parallelogram provides great flexibility for adjusting the position of the electronic teaching board and, in addition, sufficient strength for the intended application of mounting an electronic teaching board.

According to a further preferred embodiment, the arresting means comprise first rotation arresting means for arresting an adjusted rotational position of the electronic teaching board. The electronic teaching board can be locked prior to use in its set rotational position by means of the rotation arresting means.

According to a further development of this preferred embodiment, the arresting means comprise second rotation arresting means for arresting an adjusted rotational position of the rotatable leg. The mounting system can be locked in the adjusted, for instance 'folded-away' position by means of the rotation arresting means.

According to a very advantageous preferred embodiment, the first and/or second rotation arresting means are adapted to engage clampingly on a rotation shaft such that the rotation arresting means allow setting of a rotational position and, once it has been set, lock a rotational position against rotation of its own accord. Such rotation arresting means provide an increased convenience of use. This is because it is not necessary to actuate or adjust them time and again. The desired degree of arrest is adjusted once during installation of the mounting system according to the invention, after which any desired position of the electronic teaching board can be adjusted and, once set, is immediately locked against undesired movement.

According to a practical embodiment, the first and/or second rotation arresting means comprise a holder for passage of the rotation shaft, which holder is covered on the inner side with friction material and is provided with adjusting means for setting the degree of clamping of the holder. A holder with friction material is a practical and reliable embodiment for the desired function of the rotation arresting means. According to a further elegant embodiment, the leg for fixing of the electronic teaching board and/or the rotatable leg take an at least partially hollow form for the purpose of receiving a rotation shaft, and the first and/or second rotation arresting means are arranged on the respective leg.

According to another preferred embodiment, the arresting means comprise height arresting means for arresting an adjusted height position of the electronic teaching board, which height arresting means extend between two of the legs. The set height position can be locked in reliable manner by means of the height arresting means. According to a preferred embodiment, the height arresting means comprise a linear actuator. A linear actuator provides a reliable and affordable embodiment of the height arresting means.

According to a further preferred embodiment, the electronic teaching board is an electronic whiteboard, and the mounting system according to the invention is also adapted for mounting of a projector for co-action with the electronic whiteboard. In this embodiment the mounting system according to the invention is adapted for use with an electronic whiteboard. Electronic whiteboards are currently the most common electronic teaching boards in education.

According to a practical embodiment of the mounting system according to the invention, the leg for fixing of the electronic teaching board consists of two parts lying substantially mutually in line, wherein at least one of the parts is intended for passage of a part of a support for the projector. In this embodiment the mounting system takes an extremely compact form.

BEST MODE FOR CARRYING OUT THE INVENTION

Figure 1A:
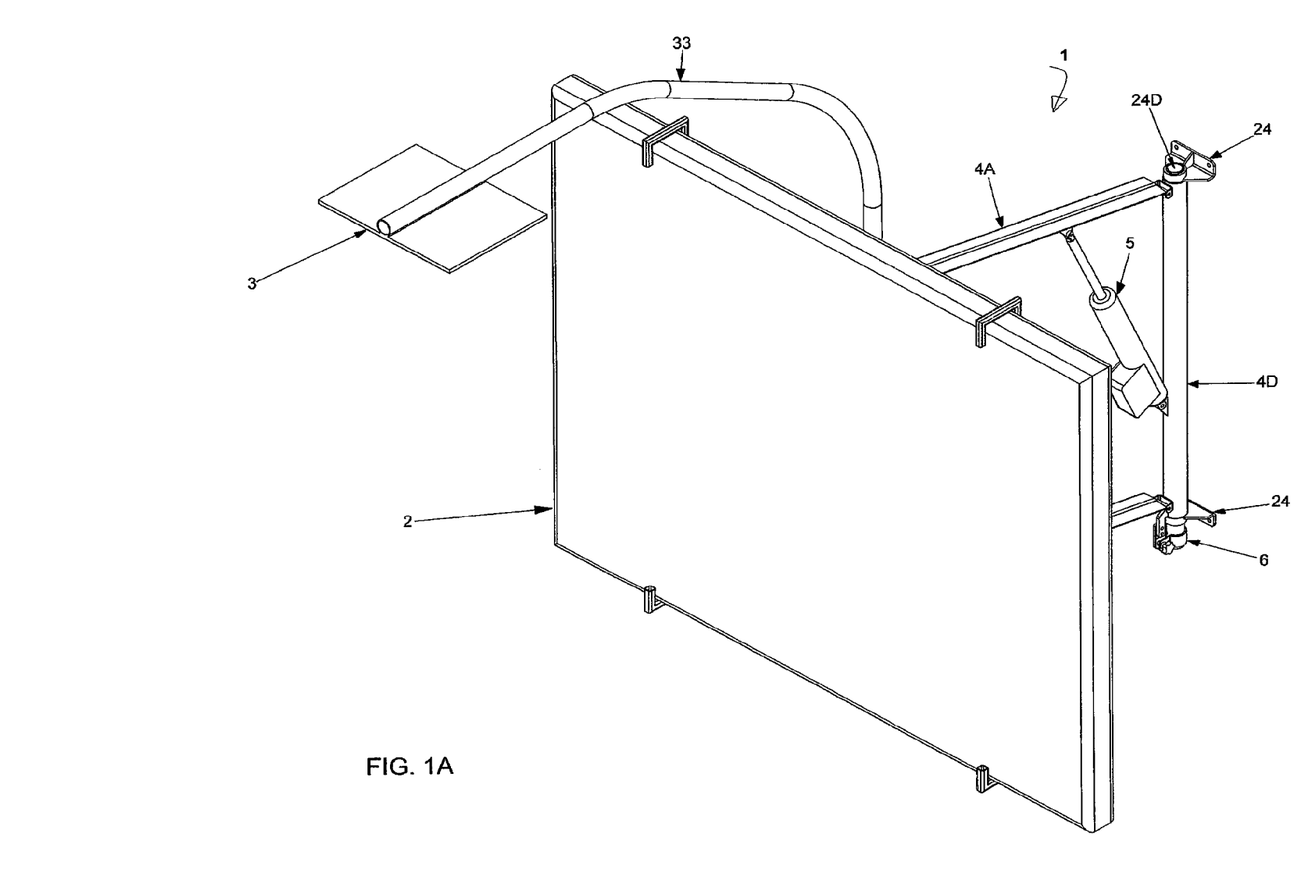
FIG. 1A shows a first preferred embodiment of a mounting system according to the invention with an electronic teaching board therein.
Figure 1B:
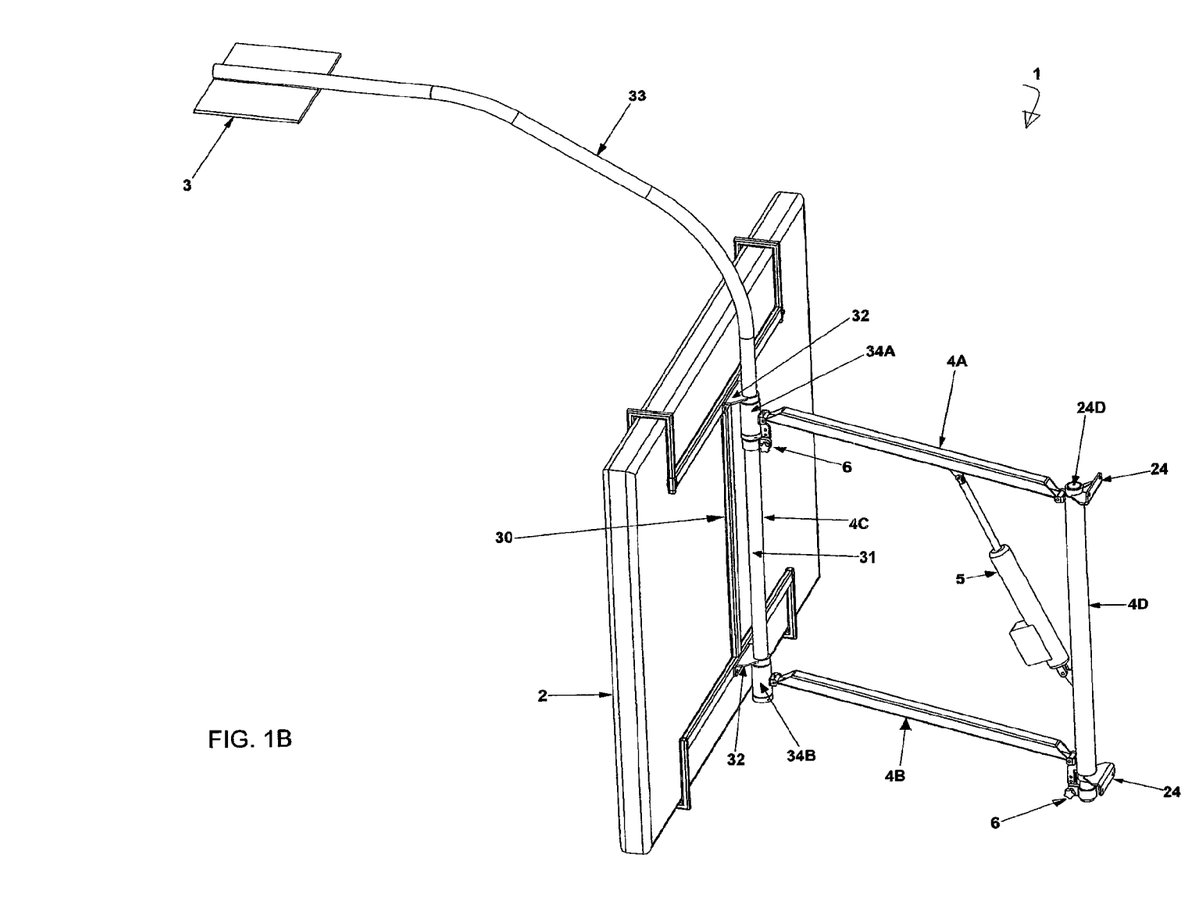
FIG. 1B shows a side view of the preferred embodiment of FIG. 1C shows a detail of FIGS. 1A and 1B.

FIGS. 1A and 1B show a first preferred embodiment of mounting system 1 according to the invention. Mounting system 1 is intended for mounting an electronic teaching board 2 on a surface, for instance a wall or a pillar (see FIGS. 2, 3, 6 and 7). Shown as an example of an electronic teaching board is an electronic whiteboard, which will be referred to simply as 'board' in the following description.

Mounting system 1 comprises four legs 4A, 4B, 4C and 4D which are mutually connected for pivoting by means of pivot points S. The resulting pivotable structure is referred to here as a 'parallelogram'. In the shown preferred embodiment the parallelogram can be fixed in the shown position to a surface (not shown). Legs 4A and 4B extend substantially parallel to each other in a generally horizontal direction. Legs 4C and 4D likewise extend substantially parallel to each other in a generally vertical direction. In the shown preferred embodiment the means for fixing mounting system 1 to the surface comprise two wall supports 24 which are mounted on leg 4D. Leg 4D is rotatable relative to wall supports 24. This is achieved in that leg 4D forms a hollow outer casing which is mounted for rotation round a tubular element 24D, which is in turn attached fixed to wall supports 24. Tubular element 24D functions as rotation shaft.

In the shown preferred embodiment the pivotable character of mounting system 1 enables a height adjustment. The set position of the four legs relative to each other can be locked using height arresting means. In the shown preferred embodiment the height arresting means preferably comprise a linear actuator 5. In the shown preferred embodiment this linear actuator 5 extends between leg 4A and leg 4D.

Mounting system 1 also comprises means for fixing board 2 to one or more of the legs. In this example board 2 is fixed in this shown preferred embodiment to leg 4C by means of a frame 30. Frame 30 is generally H-shaped and can consist of one or more parts. Fixing means 30 of board 2 are adapted for rotatable mounting relative to one of the legs, in this example leg 4C. Leg 4C forms a hollow outer casing 34. In the shown preferred embodiment the hollow outer casing consists of two bushes 34A and 34B. Bush 34A is connected pivotally to leg 4A and bush 34B is connected pivotally to leg 4B. Extending through bushes 34A and 34B is a second tubular member 31 which is rotatable relative to bushes 34A and 34B. The second tubular member 31 functions as rotation shaft. Frame 30 is attached fixedly to the rotatable tubular member 31 by means of fixing elements 32.

Figure 1C:
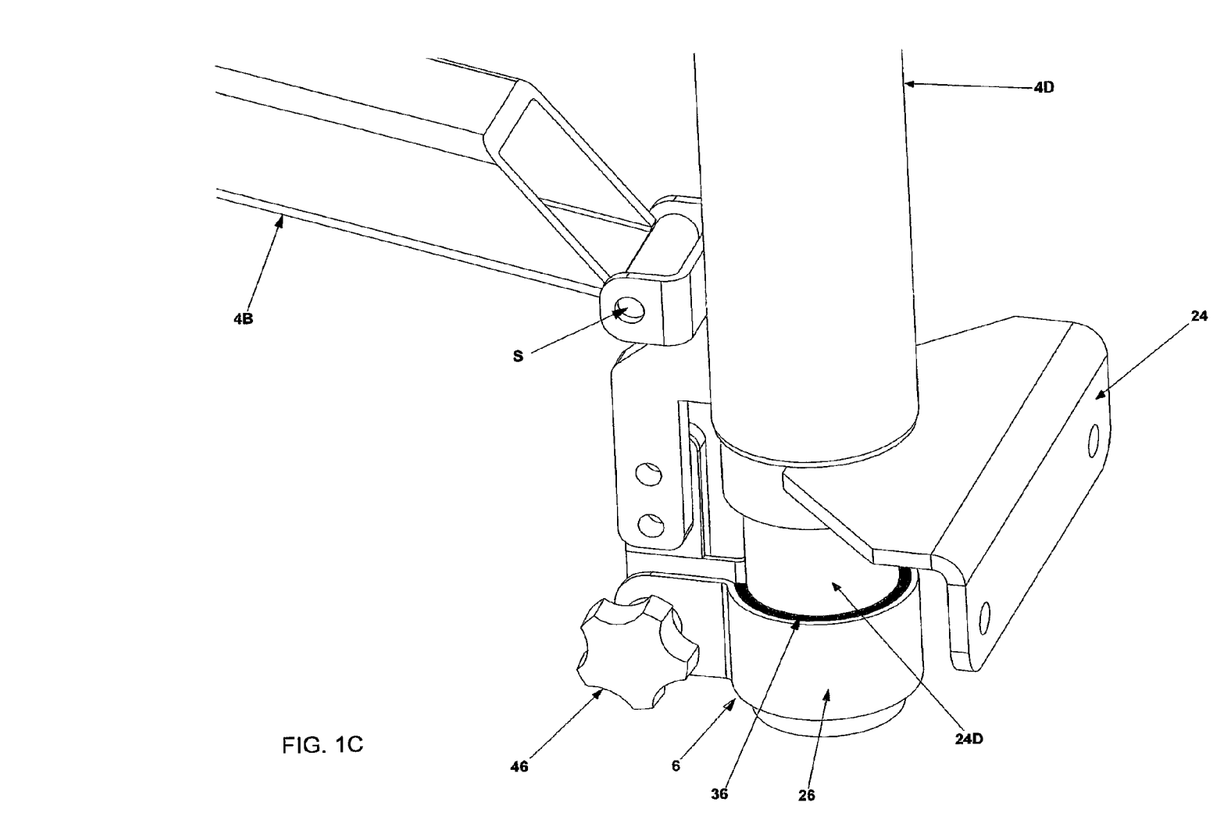

Mounting system 1 is provided with first and second rotation arresting means. The first rotation arresting means are adapted to arrest rotatable leg 4D relative to the surface. These first rotation arresting means are shown in more detail in FIG. 1C. The second rotation arresting means are adapted to arrest/lock frame 30 relative to leg 4C. Both the first and the second rotation arresting means are adapted to engage clampingly round tubular member 24D, 31 respectively. The rotation arresting means comprise a holder 26 which is covered on the inner side with friction material 36. Holder 26 clamps round tubular member 24D. The degree of clamping can be set by means of an adjusting screw 46. Holder 26 is fixedly connected to outer casing 4D. The second rotation arresting means are likewise generally designated with 6 and also comprise a holder 26 with friction material 36 and adjusting screw 46. Holder 26 is now attached fixedly to bush 34A. This fixing is similar to the fixing to 24D as shown in FIG. 1C. The friction material is preferably chosen such that it allows rotation of tubular member 24D, 31 respectively and simultaneously locks the set rotation position. Various suitable types of friction material which meet these requirements are known in the field. Several non-limitative examples are: plastic, such as high-molecular polyethylene (HMPE), Teflon or synthetic rubber, and natural rubber.

In the shown preferred embodiment mounting system 1 is intended for a board which is an electronic whiteboard. A mounting support 3 is added for the associated projector 30. Support 3 is situated on a tubular member 33 which can preferably slide into tube 31.

Figure 1D:
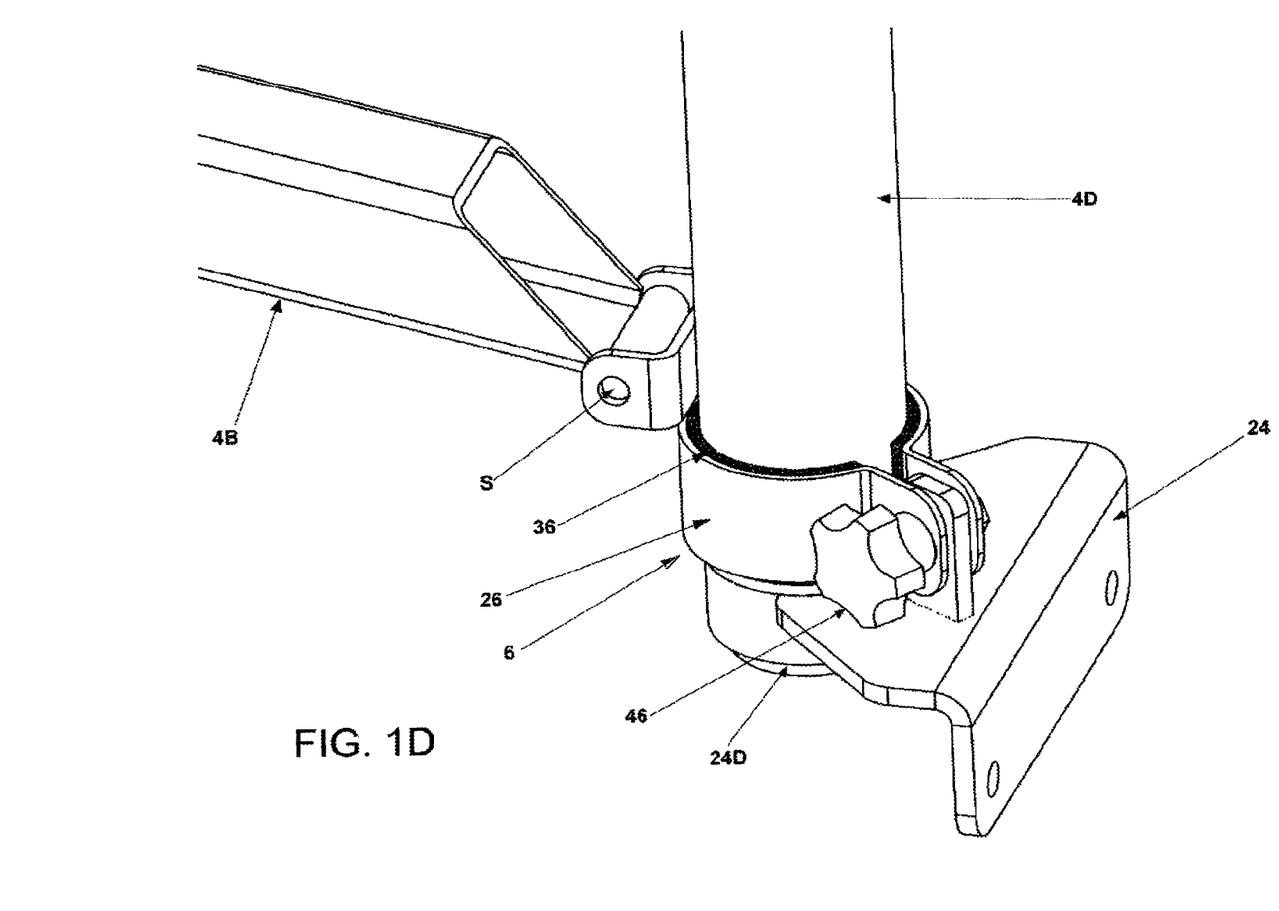
FIG. 1D shows an alternative to the rotation arresting means of FIG. 1C.

FIG. 1D shows an alternative to the first and second rotation arresting means of FIG. 1C.

The only difference between the alternative first rotation arresting means of FIG. 1D relative to those of FIG. 1C is that holder 26 now clamps on leg 4D and is attached fixedly to wall support 24, which is fixedly connected to tubular member 24D.

Figure 1E:
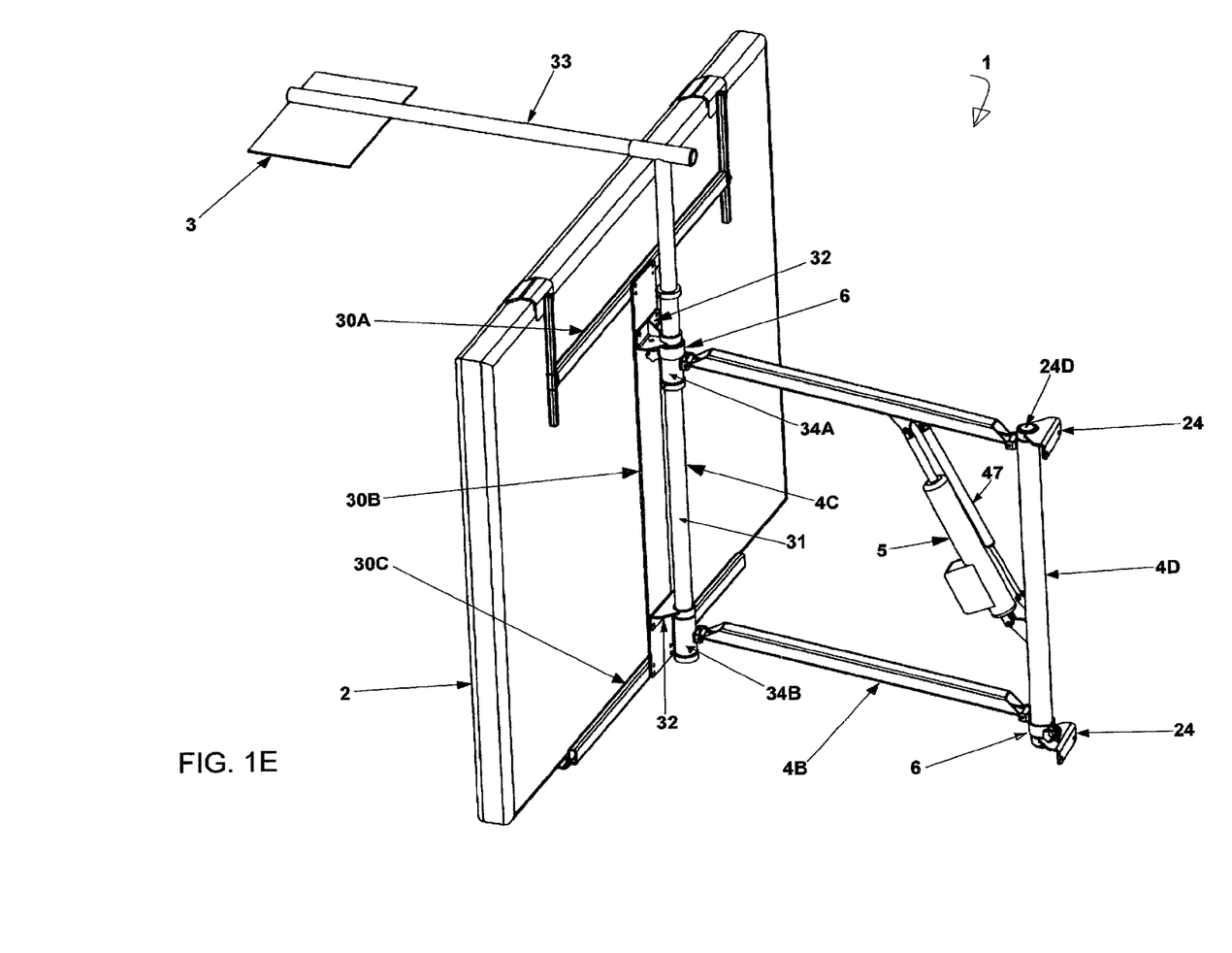
FIG. 1E shows a second preferred embodiment of a mounting system according to the invention.

Alternative second rotation arresting means (see FIG. 1 E) can be embodied in similar manner. Holder 26 is then connected fixedly to one of the fixing elements 32, which are connected fixedly to tubular member 31 of leg 4C, and then clamps on bush 34A and/or bush 34B. This fixing is similar to the fixing to 4D as shown in FIG. 1C.

FIG. 1 E shows a second preferred embodiment of mounting system 1. The second preferred embodiment differs from the first in respect of the height arresting means, wherein a damper 47 is now added to actuator 5 in order to damp particularly the downward movement. Damper 47 can for instance be a gas spring. The alternative rotation arresting means of FIG. 1D are also incorporated herein.

Figure 2:
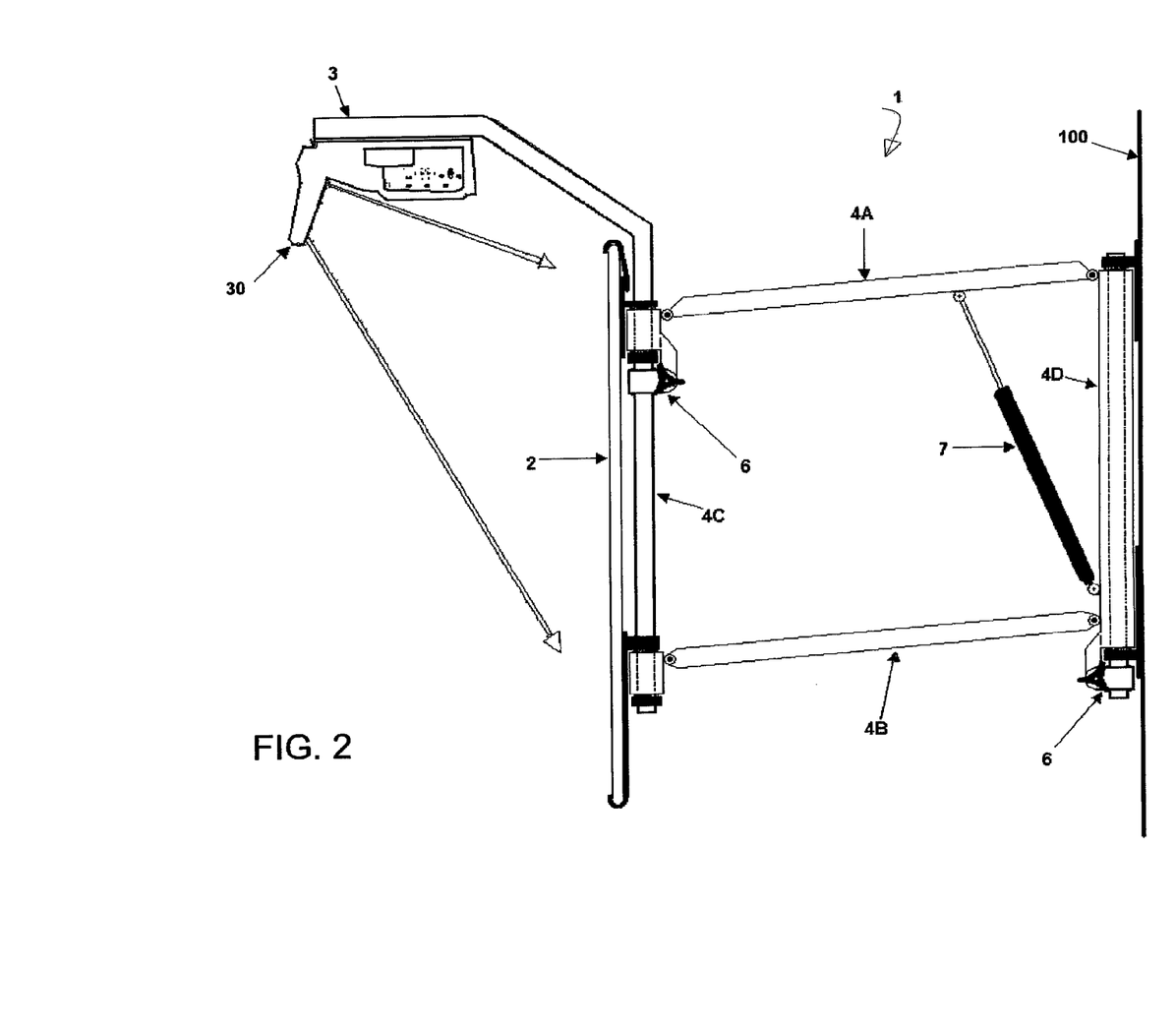
FIG. 2 shows a third preferred embodiment of the mounting system according to the invention.

FIG. 2 shows a third preferred embodiment of mounting system 1, which is fixed to wall 100. The third preferred embodiment differs from the first in respect of the height arresting means, which are now embodied as a spring 7, for instance a gas spring. Because the weight of mounting system 1 itself and that of board 2 and projector 3 must be compensated, it is possible to use an adjustable spring or to make the point of engagement of spring 7 displaceable.

Figure 3:
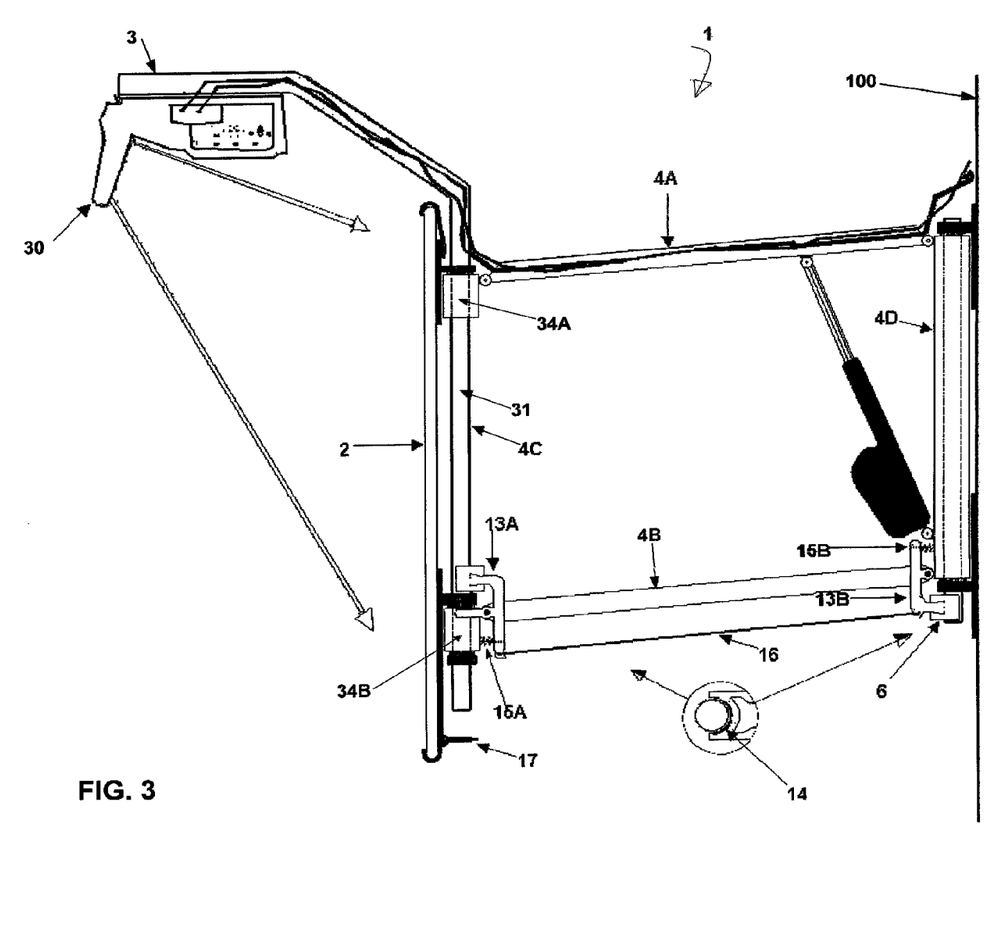
FIG. 3 shows a fourth preferred embodiment of the mounting system according to the invention.

FIG. 3 shows a fourth preferred embodiment of mounting system 1, which is fixed to wall 100. The fourth preferred embodiment differs from the first preferred embodiment in respect of the embodiment of the rotation arresting means. The rotation arresting means comprise an alternative arresting device 13, but without operating means. The inner side of a fork-like element 14, which clamps on the tube, is covered with friction material. A pull rod 16 ensures that arresting device 13B on the wall side is released simultaneously with arresting device 13A on the operating side.

Figure 4:
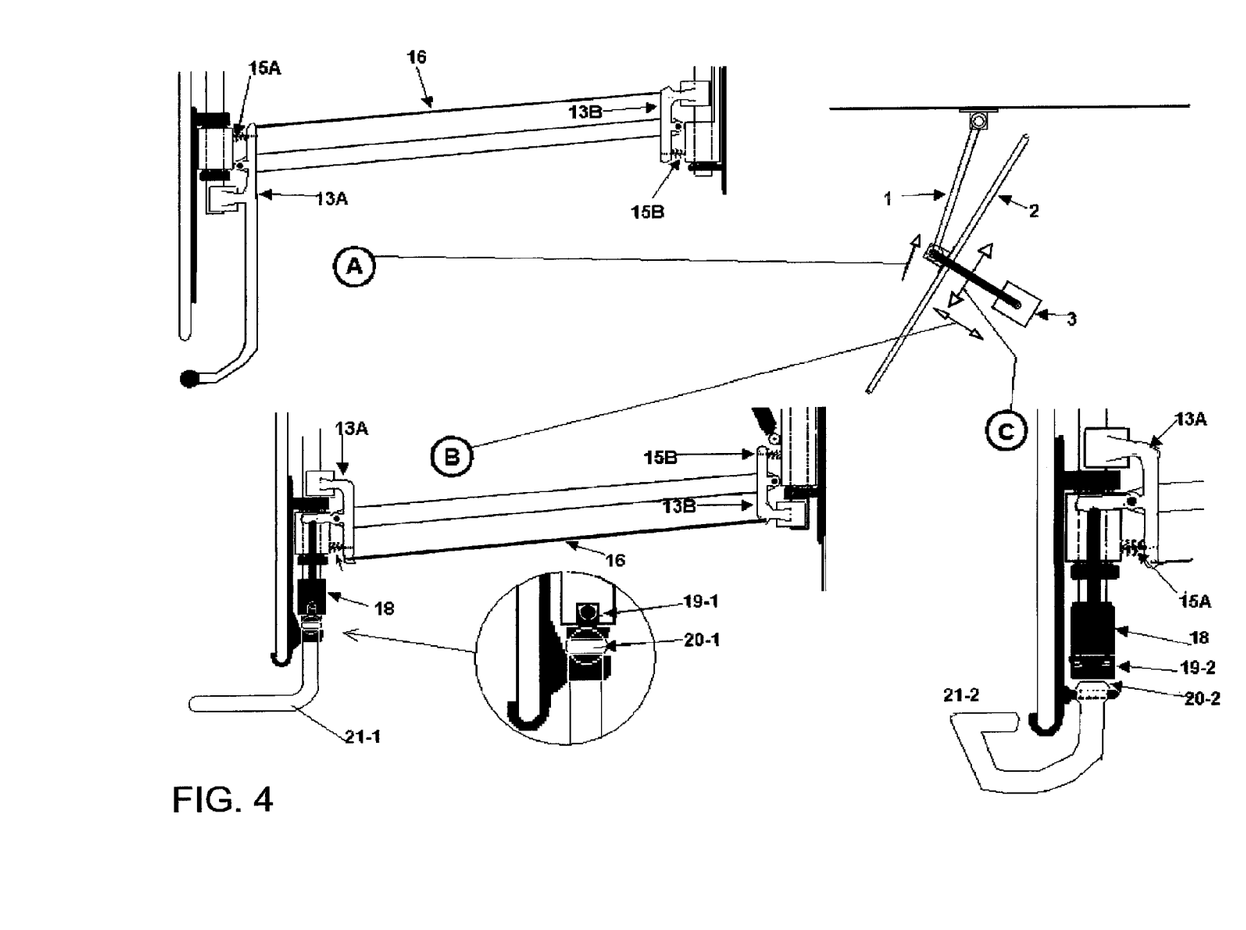
FIGS. 4, 5A and 5B illustrate the alternative rotation arresting means of FIG. 3 in more detail.
Figure 5A:
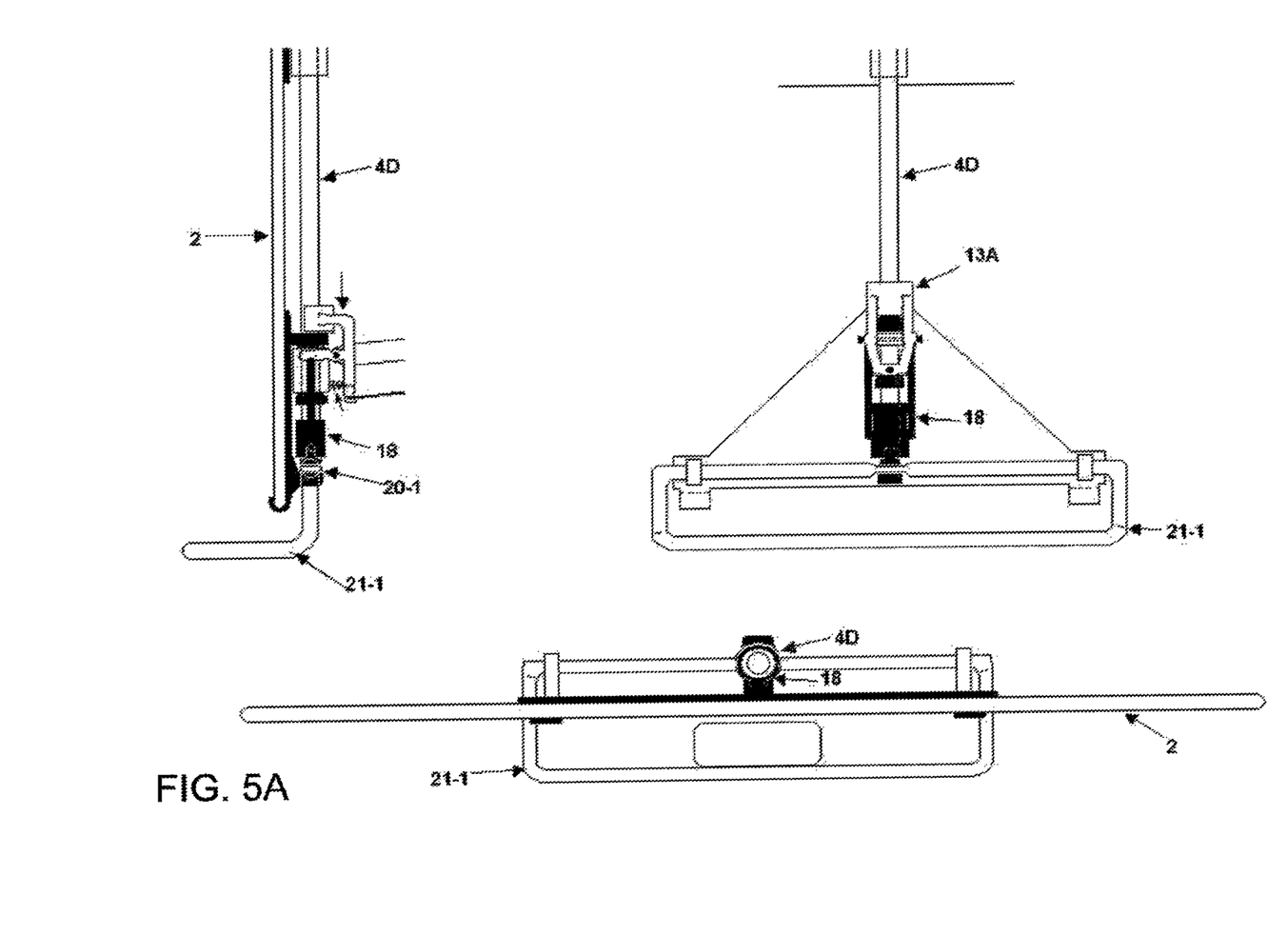
Figure 5B:
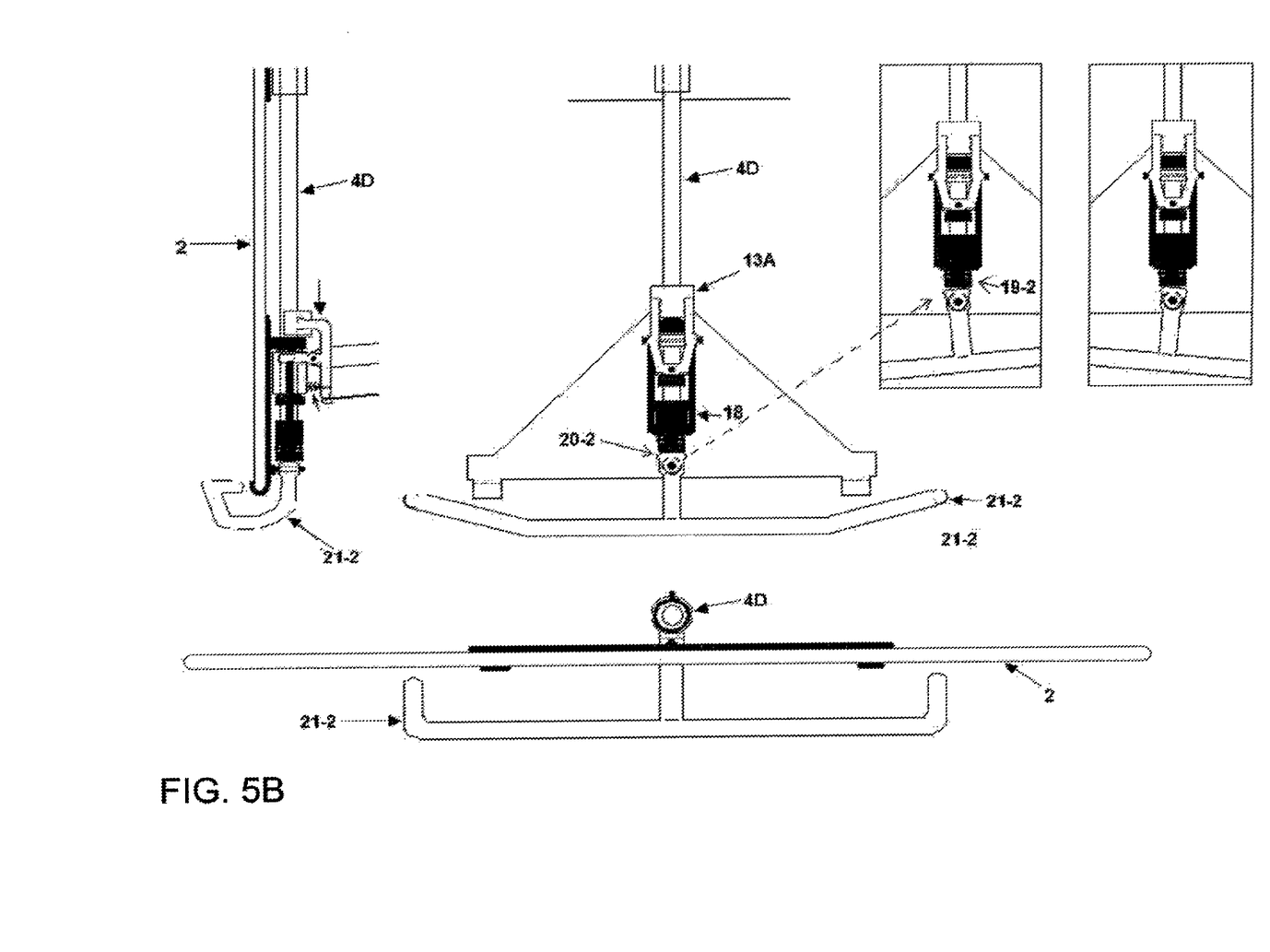

FIGS. 4, 5A and 5B illustrate the alternative rotation arresting means of FIG. 3 in more detail.

Depending on the desired friction on the points of rotation, it can also suffice for a good operation to provide for sufficient friction on the tube: with arrest 13 or with a clamping ring 6 with suitable brake lining or rubber. In this case FIGS. 4, 5A and 5B are not relevant.

A mechanical operation of arresting device 13 is elaborated in FIG. 4. Arresting device 13B on the wall side is co-displaced from the front operating means using a pull rod 16. Electromagnetic operation is otherwise also an option.

Three versions are shown; FIG. 4 shows at top right the direction in which the forces are exerted during operation according to system A, B and C respectively. System A is the simplest, but imparts a movement in the direction of the leg of mounting system 1: this seems unnatural to the user. Systems B and C have also been developed for this reason. In these cases the point of rotation of the operating means is situated behind board 2. An eccentric point of rotation ensures that, irrespective of the position of the digital board, the force is transferred to arresting device 13 by a sliding sleeve 18. Pressure pin 19-1 or pressure ring 19-2 transfers the force to sliding sleeve 18. A ball can be added at 19-1 or a bearing at 19-2 to allow smoother running thereof. The operation of eccentric 20 is possible in different ways, wherein the forces are at right angles to the digital board in system B and parallel to the digital board in system C.

Operating system B of FIG. 4 is further developed in FIG. 5A.

A flattened part 20-1 of operating rod 21-1 is tilted so that pressure pin 19-1, and thereby also sliding sleeve 18, are pressed upward.

Operating system C of FIG. 4 is developed further in FIG. 5B.

This system makes use of a swing arm 21-2 to operate eccentric 20-2. This can hereby be moved up or downward with one hand, wherein arresting device 13 is released. The digital board can be positioned more accurately when operated with two hands.

Parts of the operating systems B and C can be combined with each other. A small tray in or on the bracket provides space for the digital pen.

Figure 6:
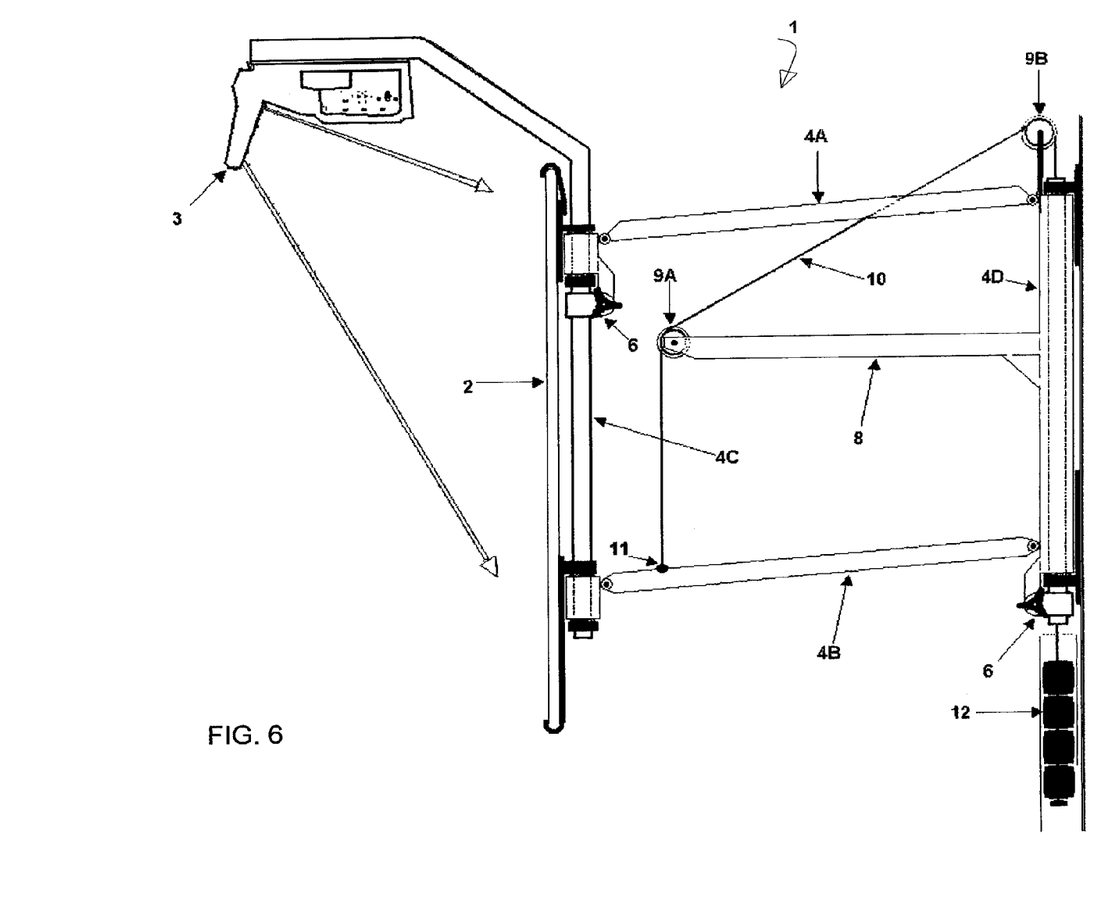
FIG. 6 shows a fifth preferred embodiment of the mounting system according to the invention.

FIG. 6 shows a fifth preferred embodiment which differs from the first preferred embodiment in respect of the height arresting means. Alternative height arresting means provided with a cable construction 8, 9, 10, 11 with a counterweight 12 are applied herein. The structure can be made weight-neutral by modifying the weight and/or displacing attachment point 11 of cable 10.

In this case an adjustable friction (for instance a tightening screw with spring at point B) can be made in one of the pivot points, so that the digital board remains in place in more stable manner and smaller differences in force are compensated.

Figure 7:
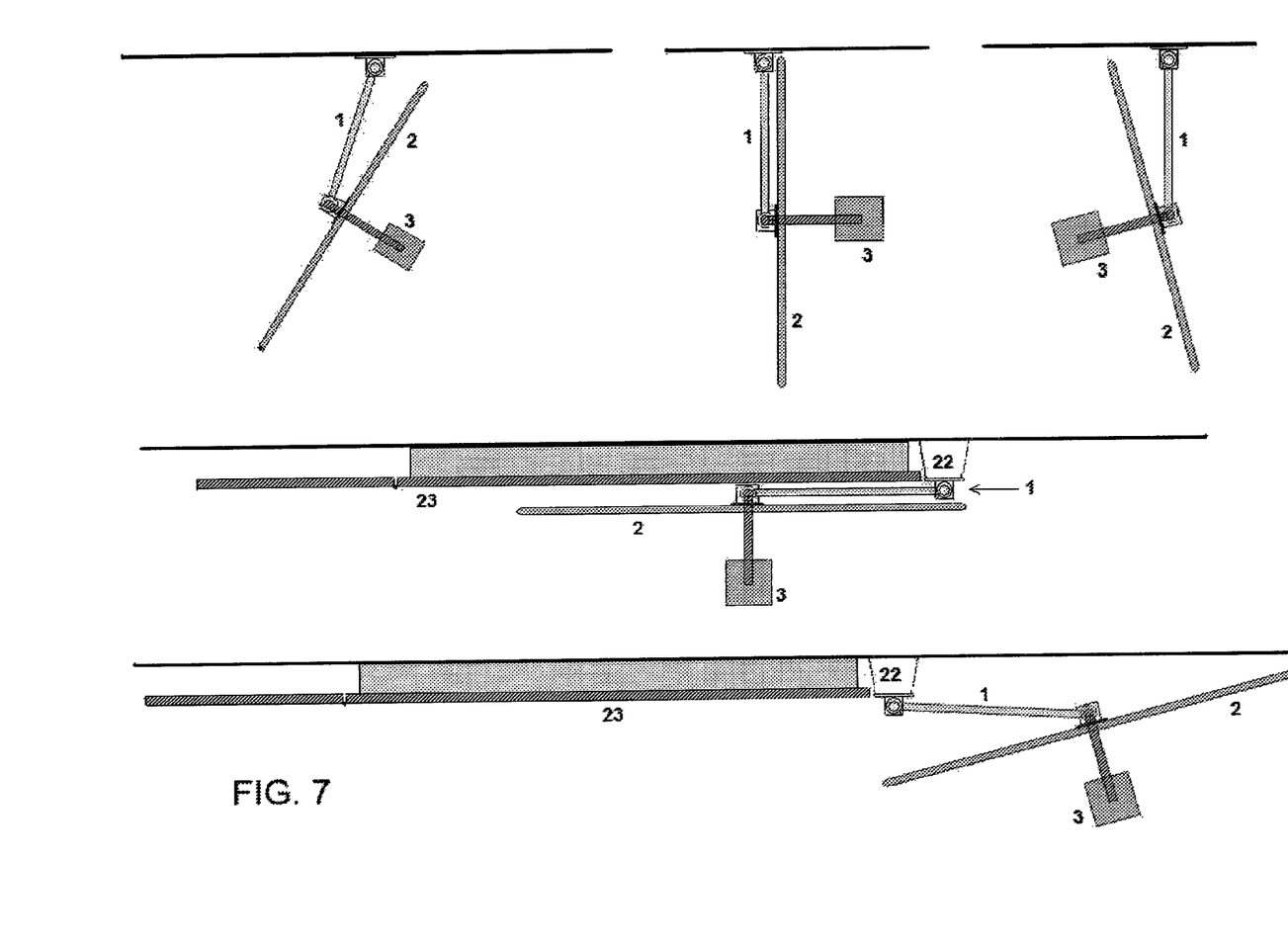
FIG. 7 shows a number of possible positions of use of the mounting system according to the invention.

FIG. 7 shows a top view of a number of the many positions in which digital board 2 can be used with this mounting system 1. Students always watch from the side of projector 3 and, depending on the arrangement, this can be the whole class or a part thereof.

By placing the fixing on the wall side on a spacing support or pillar 22, the whole 1, 2, 3 can be mounted close to an existing teaching board 23. In the drawing the right-hand side board is removed herefrom (the light in classrooms generally enters from the left, so it is better to place the digital board on the right-hand side).

Arranging a fixed, writable whiteboard behind or adjacently of the whole 1, 2, 3 is of course also possible.

Summarizing, the invention provides a mounting system which makes it possible to use a digital board in different positions. Use is made for this purpose of a rotatable parallelogram structure behind the board, with rotation points close to the board and close to the fixing on the wall. The rotation points are provided with an arrestable friction so that the board remains in place in any position. The parallelogram structure can pivot up and downward so that the board is height-adjustable. The length of the legs is equal to roughly half the width of the digital board. A linear motor (actuator), a spring construction and/or counterweight is used to displace the board up and downward and to compensate the weight of the board, the projector and the own weight thereof.

Owing to the height adjustment the full height of the board can be used optimally, and the board can moreover be used by children or people in for instance a wheelchair.

If desired, the wall supports can be extended or be placed on a pillar so that the structure can pivot adjacently of an existing blackboard, for instance at the position of the current right-hand side board. In this case the current chalkboard need not be removed.

Finally, the invention is expressly not limited to the described and shown embodiments, but also expressly includes all possible combinations thereof.

The mounting system according to the invention is generally suitable for mounting digital teaching boards and is described for application with an electronic whiteboard. It will be apparent that the mounting system according to the invention is however also suitable for mounting other types of digital teaching board, including touch screens such as LCD or plasma screens, in addition to screens operating with other technologies, such as infrared and ultrasonic technologies.

The invention claimed is:

1. A mounting system (1) for adjustably mounting an electronic teaching board (2) on a surface, wherein the mounting system is adapted such that the position of the electronic teaching board relative to the surface can be adjusted in both horizontal and vertical direction, said mounting system comprising four legs (4A, 4B, 4C and 4D) wherein the four legs (4A, 4B, 4C and 4D) are connected in mutually pivotable manner to form a parallelogram, first fixing means (30) for fixing the electronic teaching board to a first one of the legs (4C) such that the electronic teaching board extends parallel to the first leg (4C), wherein the first fixing means comprise a frame (30) attached fixedly to a tubular member (31), second fixing means (24) for fixing at least a second one of the legs (4D) to the surface, such that the second leg (4D) extends parallel to the surface, said second leg (4D) extending substantially parallel to the first leg (4C), wherein the second fixing means comprise two wall supports (24) and a tubular element (24D) attached to the wall supports, wherein the first fixing means (30) are adapted for rotatable fixing of the electronic teaching board to the first leg (4C) and wherein the second fixing means (24) are adapted for rotatable fixing of the second leg (4D) to the surface, which mounting system further comprises arresting means for arresting the electronic teaching board in the adjusted position, wherein the arresting means comprise first rotation arresting means for arresting an adjusted rotational position of the electronic teaching board by arresting the first fixing means (30) relative to the first leg (4C), wherein the arresting means comprise second rotation arresting means for arresting an adjusted rotational position of the rotatable second leg (4D) relative to the second fixing means (24), wherein the first leg (4C) for fixing of the electronic teaching board takes an at least partially hollow form for the purpose of receiving a first rotation shaft formed by the tubular member (31) and the rotatable second leg (4D) takes an at least partially hollow form for the purpose of receiving a second rotation shaft formed by the tubular element (24D), and wherein the at least one of the rotation arresting means are arranged on the respective leg and are adapted to engage clampingly on a rotation shaft such that the rotation arresting means selectively locks against rotation.

2. A mounting system (1) as claimed in claim 1, wherein the first and second rotation arresting means comprise a holder (26) for passage of the rotation shaft (31 respectively 24D), which holder is covered on the inner side with friction material (36) and is provided with adjusting means for setting the degree of clamping of the holder.

3. A mounting system (1) as claimed in claim 1, wherein the arresting means comprise height arresting means for arresting an adjusted height position of the electronic teaching board, which height arresting means extend between two of the legs (4A, 4D).

4. A mounting system (1) as claimed in claim 3, wherein the height arresting means comprise a linear actuator (5).

5. A mounting system (1) as claimed in claim 1, wherein the electronic teaching board is an electronic whiteboard, and wherein the mounting system is also adapted for mounting of a projector for co-action with the electronic whiteboard (2).

6. A mounting system (1) as claimed in claim 5, wherein the leg (4C) for fixing of the electronic teaching board consists of two parts (34A and 34B) lying substantially mutually in line, wherein at least one of the parts is intended for passage of a part of a support (3) for the projector.

* * * * *